United States Patent [19]

Rothschild

[11] 3,868,087
[45] Feb. 25, 1975

[54] MOLD FOR FORMING DISPENSING CONTAINERS

[75] Inventor: Henry Rothschild, Cherry Hill, N.J.

[73] Assignee: Caddy Corporation of America, Pitman, N.J.

[22] Filed: May 7, 1973

[21] Appl. No.: 357,934

[52] U.S. Cl. .................................. 249/137, 425/435
[51] Int. Cl. ............................................. B29c 5/04
[58] Field of Search ............ 249/137; 425/402, 425, 425/429, 430, 435

[56] References Cited
UNITED STATES PATENTS

| | | | |
|---|---|---|---|
| 3,341,896 | 9/1967 | Barnett et al. | 425/429 X |
| 3,510,911 | 5/1970 | Alter | 425/435 |
| 3,703,348 | 11/1972 | Pivar | 425/435 X |

Primary Examiner—Francis S. Husar
Assistant Examiner—John E. Roethel
Attorney, Agent, or Firm—Curtis, Morris & Safford

[57] ABSTRACT

A mold for use in forming a one-piece thermoplastic container for a stack of objects in a rotational molding process is formed from a hollow tubular mold member having opposed opened and closed end portions conforming generally to the configuration of the containers to be formed. The mold has a laterally extending flange located adjacent its opened end portions with a plurality of projections formed thereon extending away from the opened end portion and parallel to the longitudinal axis of the mold. These projections are hollow and open at their inner end, through the flange, thereby to form mold sections which are used to form projections on the container being formed with the mold in the rotational molding process.

8 Claims, 6 Drawing Figures

PATENTED FEB 25 1975

MOLD FOR FORMING DISPENSING CONTAINERS

The present invention relates to a mold for use in forming plastic articles and more particularly to a mold for use in a rotational molding process for forming a container adapted to be used to hold a stack of objects.

Hollow containers for holding stacks of objects, such as plates, dishes and the like are often used as self leveling dispensing devices in which a spring mechanism is positioned in the inside of the container in order to raise the stack of dishes or the like as the topmost dish is removed from the container. Typically, such containers are relatively expensive to manufacture since they are made of a series of metal parts which must be welded or otherwise secured together. For example, these dispensing containers generally comprise a cylindrical metallic stainless steel tube, a base welded at one end of the tube, and a flange at the other end of the tube for providing mounting of external vertically extending guides for the plates or dishes at the top of the stack. Typically, such guides represent additional independent members which are screwed or otherwise secured to the flange. Thus, such guides often become loose and lost. Moreover, the labor required in manufacturing metallic dispensing containers in this manner is substantial, therefore inordinately increasing the cost of production thereof.

I have found that the above problems can be avoided by forming the dispensing container in a one-piece construction with integral guide projections at the opened end thereof. While this possibly could be accomplished by conventional injection molding processes, such processes are relatively expensive and thus are impractical for economic or mass production manufacture or dispensing containers. I have found however that recently developed rotational molding processes are highly suitable for use in manufacturing one-piece dispensers having guide projections extending from the open end thereof. The critical problem in producing containers of this type, in one-piece construction, by rotational molding processes is the manner of forming the projections on the one-piece container with molds previously proposed for use in rotational molding processes.

Heretofore, the rotational molding process has been limited to the formation of cylindrical or tubular members because the heat required for the process must be applied substantially directly to the exterior surface of the mold. Thus, it was considered impossible to form satisfactory complex molded articles or articles having projections and the like extending from the cylindrical member by the rotational molding process.

Accordingly, it is an object of the present invention to provide a one-piece thermoplastic dispensing container having integrally formed object guide projections located at the opened end thereof.

Yet another object of the present invention is to provide a mold for use in a rotational molding process which is adapted to form a dispensing container of the character described.

Yet another object of the present invention is to form an object dispensing container which is economical in manufacture and durable in use.

A still further object of the present invention is to provide a mold for a rotational molding process which is adapted to form a cylindrical container with projections extending from a position adjacent an open end thereof.

In accordance with an aspect of the present invention a cylindrical container for use in dispensing objects from a stack of objects or plates contained therein is formed as a one-piece hollow molded thermoplastic tubular member having first and second longitudinally spaced end portions. The first end portion of the tubular member is closed with an integrally formed bottom and the second portion thereof is opened and has a peripheral flange which extends outwardly from the tubular member. This flange has a plurality of hollow projections which extend upwardly therefrom and away from the open end of the tubular member along lines extending generally parallel to the longitudinal axis of the tubular member. The projections form guide projections for the top objects or plates in a stack contained within the tubular member.

The one-piece dispensing container of the present invention is formed, in accordance with another aspect of the present invention, in a rotational molding process by a specially constructed mold which conforms substantially in configuration to the dispensing container which it is used to form. The mold constitutes a hollow tubular mold member having first and second longitudinally spaced end portions with the first end portion thereof being closed by an integral or welded bottom plate secured thereto. The opposite or second end portion of the mold is open and has a peripheral flange secured thereto which extends outwardly from the main tubular member. The flange has a plurality of hollow projections which extend outwardly therefrom and away from the opened end of the tube along lines extending generally parallel to the longitudinal axis of the tubular member. The projections are open through the flange to the atmosphere so that heat from the heat source used in the rotational molding process will enter the interior of these projections and heat the same in order to permit the thermoplastic material used in the process to form thereabout.

The above, and other objects, features and advantages of this invention, will be apparent in the following detailed description of an illustrative embodiment thereof which is to be read in connection with the accompanying drawing, wherein.

Figure 1:
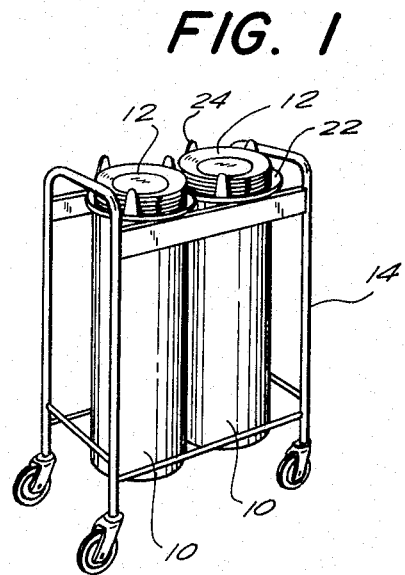
FIG. 1 is a perspective view of a dispensing cart supporting dispensing containers constructed in accordance with the present invention.

Referring now to the drawing in detail, and initially to FIG. 1 thereof, it is seen that a pair of dispensing containers 10, constructed in accordance with the present invention, are used to support a stack of dishes 12 or the like therein. Preferably, such dispensing containers have a spring mechanism of conventional construction positioned within the interior thereof in order to resiliently support the stack of dishes 12. As is well known, such spring mechanisms operate such that as individual plates or objects are removed from the stack, the stack raises slightly in order to keep the top of the stack at substantially the same level. In one embodiment of the present invention such dispensing containers are adapted to be supported in a mobile cart 14, as illustrated in FIG. 1, in order to transport the containers and their contents from place to place.

Figure 2:
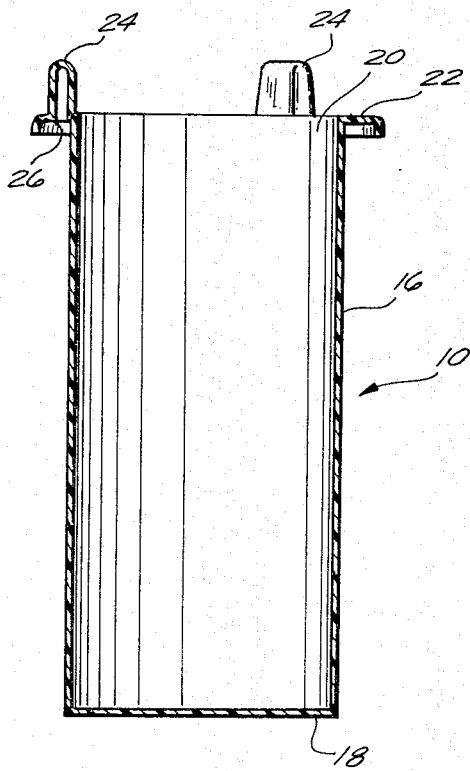
FIG. 2 is a sectional elevational view taken through one of the dispensing containers illustrated in FIG. 1.

Containers 10 of the present invention are formed as one-piece integrally molded thermoplastic members, as seen in FIG. 2. Preferably, the containers are formed of polyethylene, in a rotational molding process as described hereinafter, or they can be formed of polystyrene or other available thermoplastic materials. Each container 10 consists of a generally cylindrical or tubular main body member 16 having a closed bottom end 18 and an open upper end 20. The open upper end 20 of container 10 has an integrally formed peripheral flange 22 which extends about the entire top edge of the container. As seen in FIG. 1, this peripheral flange can be utilized to support the containers on cart 14.

A plurality of projections 24 (three in the illustrative embodiment) are integrally formed with flange 22 and extend upwardly therefrom along lines which are generally parallel to the longitudinal axis of the container. These projections serve as guide members to retain the uppermost plates in a stack within the container in a relatively fixed position to prevent their inadvertently falling from the stack, for example, when cart 14 is moved from place to place. As a result of the process by which the container 10 is formed, projections 24 are hollow members and open at the bottom ends 26.

Figure 4:
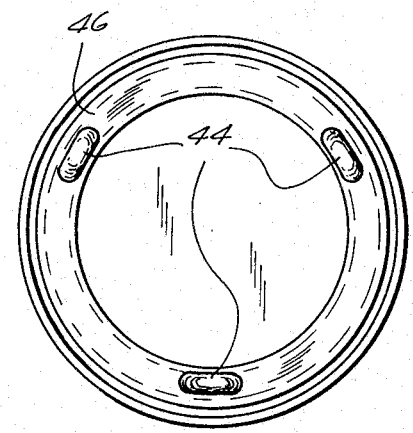
FIG. 4 is a plan view taken along line 4—4 of FIG. 3, with the mold cover removed.
Figure 3:
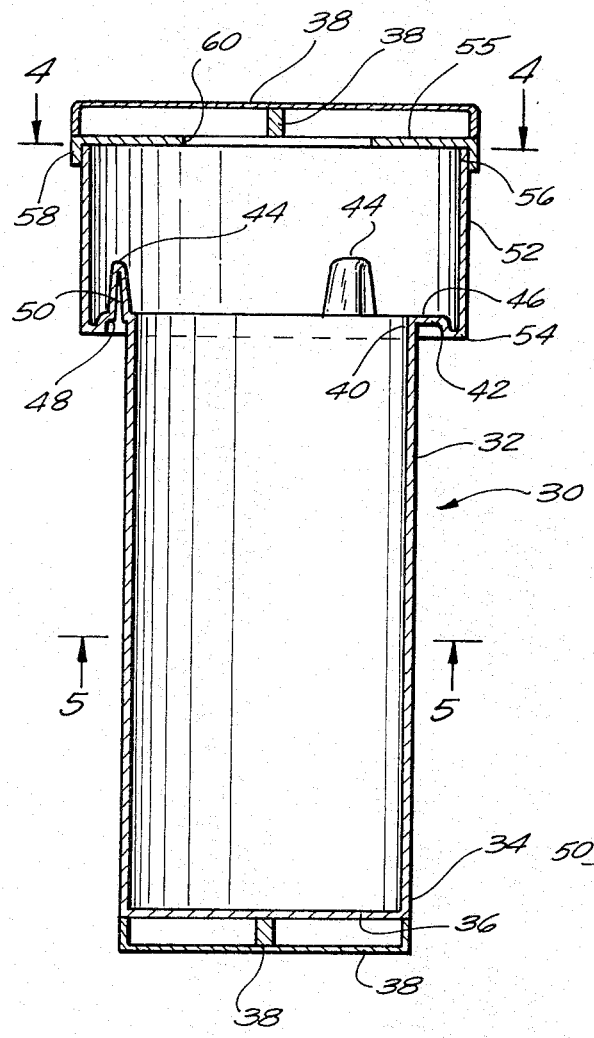
FIG. 3 is a sectional elevational view of a mold constructed in accordance with the present invention for use in forming the container illustrated in FIG. 2.
Figure 5:
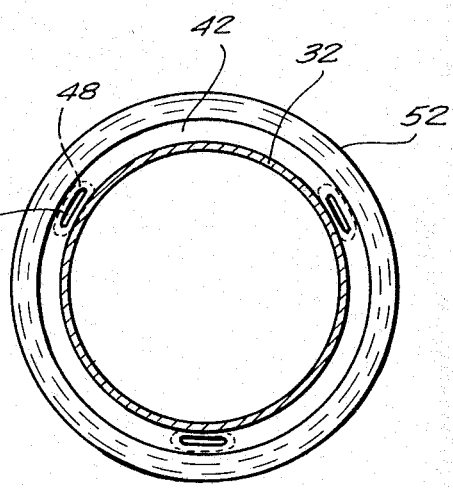
FIG. 5 is a bottom sectional veiw taken along line 5—5 of FIG. 3.

Containers 10 are formed in a rotational molding process, as described more fully hereinafter, by the use of a mold 30, as illustrated in FIGS. 3-5. Mold 30 has a configuration which conforms generally to the configuration of container 10; in particular, its interior dimensions are substantially the same as the exterior dimensions of the container and in fact the container is formed by application of plastic material to the internal surfaces of the mold.

Basically, mold 30 consists of a generally cylindrical tubular main mold portion 32 having a bottom end 34 which is closed by an end plate 36 or the like. Plate 36 may be integrally formed with main tubular member 32 or may be welded directly thereto in any convenient manner. It is noted in this connection that mold 30 is formed of a metallic material in order to provide good transfer of heat to the plastic during the mold forming process as described hereinafter.

Bottom end portion 36 of the mold 30 is provided with a pair of U-shaped metal frame members 38 secured thereto at right angles to each other (so that only one is seen in FIG. 3) by welding so as to be rigidly connected to the mold. These frame members are used for mounting the mold in the machine which performs the molding process as described hereinafter.

Main mold member 32 also includes an upper end portion 40 to which an integral laterally extending flange 42 is connected in any convenient manner as for example by welding or the like. As seen in FIG. 4, this flange is a generally circular member which surrounds the upper end portion 40 of main mold member 32.

Flange 42 is provided with a plurality (preferably three) of extension mold members or projections 44 formed on the upper surface 46 thereof. In one embodiment of the invention these mold members are generally tapered metal segments which are secured to flange 42 by welding or the like. In accordance with a feature of the present invention projections 44 are hollow members, as seen at the left in FIG. 3, which open through openings 48 in flange 44 to the atmosphere and towards the lower or closed end 36 of the mold. Thus, the projections have a wall thickness which is substantially the same as, or smaller than, the wall thickness of mold member 32. This is an important aspect of the present invention since it permits heat to enter into the space 50 within the projections 44 in order to uniformly heat the projections so that the thermoplastic material will form thereabout during the molding process in order to form the projections 24 on the container 10.

Flange 42 is also provided with an integral upwardly extending collar 52 which is secured by welding or the like to the edge 54 of the flange. Collar 52 does not actually form a portion of the mold structure per se, in that it is not used to form a portion of the container 10; however the collar is an extension which provides for mounting of the mold in the apparatus which performs the process and serves to space a cover 55 for the mold from the tops of projections 44.

Cover 55 is a generally circular member in plan, which can be detachably connected to the upper edge 56 of collar 52 in any convenient manner. In one embodiment of the invention cover 55 has a peripheral flange 58 which can be simply frictionally engaged over the upper edge 56 of collar 52. Cover 55 is provided with a pair of inverted U-shaped frame members 38 which are secured thereto by welding or the like, for the purpose of mounting the container within the rotational molding apparatus, as described hereinafter. In addition, cover 55 includes a central opening 60 which provides visual access into the interior of the mold during the molding process and which permits placement of additional thermoplastic material within the mold during the process itself.

Figure 6:
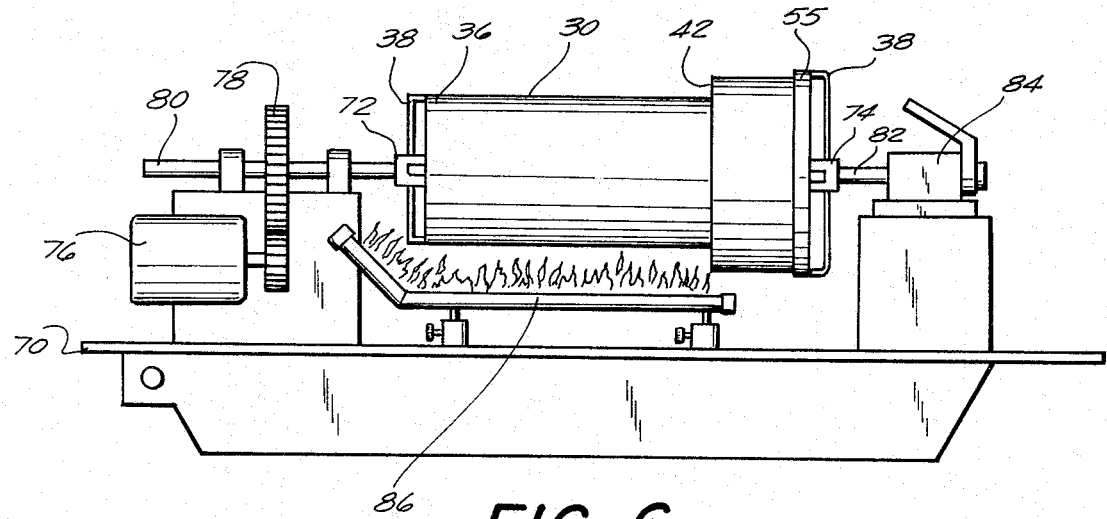
FIG. 6 is an elevational view of an apparatus in which the mold of FIG. 3 is used to form the container of FIG. 2 by a rotational molding process.

The rotational molding process in which mold 30 of the present invention is used to form the container 10 may take the form of any of the known conventional rotational molding processes, but preferably is the type of process performed by the apparatus disclosed in U.S. Pat. No. 3,703,348. This apparatus is illustrated schematically in FIG. 6 of the drawing and includes a stand 70 which is constructed to have two stable positions of equilibrium, as described in said aforementioned patent, so that the frame can remain in a relatively horizontal position, as illustrated in FIG. 6, or a tilted position wherein the right end of the frame is higher than the left. Mold 30 of the present invention is mounted on frame 70 for rotation about its longitudinal axis by a drive head 72 which can be removably connected to the support bars 38 at the bottom end 36 of the mold, in any convenient manner as would occur to those skilled in the art. The opposite or upper end of the mold is supported by the support members 38 on cover 55 of the mold in a rotatably mounted support head 74.

The mold 30 is rotated through head 72 from a motor 76, gear train 78 and a drive shaft 80 operatively connected between the gear train 78 and head 72. Head 74, on the other hand, is rotatably mounted on a clamp shaft 82, in any convenient manner, with that shaft being laterally reciprocal by a conventional plunger clamp 84, so as to permit the head 74 to be moved away from the mold, thereby permitting the mold to be removed from the apparatus.

Frame 70 includes a gas burner 86 of conventional construction positioned to be located below mold 30, so as to direct heat upwardly against the outer surface of the rotating mold without allowing heat to enter the opening 60 in the cover 55. Since, in accordance with the present invention, the container 10 formed in the mold 30, is only formed over the cylindrical portion 32 of the mold and the portions thereof adjacent flange 42, burner 86 terminates adjacent flange 42 and does not extend up to or along the collar portion 52 of the mold.

In the production of the container 10 by the apparatus shown in FIG. 6, cover 55 is initially placed on the mold and the mold is mounted between heads 72, 74 by appropriate adjustment of the clamp 84. Initially, frame 70 is placed in an inclined position and an initial portion of the thermoplastic charge from which the container 10 is to be formed is placed in the mold through the opening 60 in the cover 55. Thence, rotation is begun by operation of the motor 76, and burner 86 is ignited. Thereafter, rotation of the mold continues in the inclined configuration of frame 70 for a predetermined period of time until the bottom portion 36 of the mold has been coated with thermoplastic material to the desired wall thickness. Thereafter, frame 70 is placed in a horizontal position, as shown in FIG. 6, and rotation of the mold is permitted to continue until the remainder of the mold has been coated and the fusion of the plastic to the mold is completed. The opening 60 in the cover 55 permits the operator to visually observe the inside of the mold to determine whether proper coating thereof is occurring. When additional material is required to coat the inside of the mold along the portions 32, 44 thereof, the materials can be inserted through opening 60 in cover 55 during rotation of the mold. The material placed in the mold will generally remain longitudinally motionless with respect to the axis of rotation of the mold so that the material can be carefully applied to the mold during operation.

Because of the construction of the mold 30 of the present invention, and in particular because of the configuration of the hollow projections 44, the rotational molding process can coat projections 44 to form the guide projections 24 in the completed container. This result is primarily due to the fact that the projections 44 are hollow and are open to the atmosphere through the openings 48 in flange 42. By this construction the products of combustion and heat produced by the burner 86 can enter the chamber 50 of the projections 44 to uniformly heat the surfaces thereof, even though the projections themselves are fully enclosed within the mold by collar 52. As a result, the thermoplastic material placed in the mold during operation of the rotational molding cycle will coat and adhere to the projections 44 in order to form the projections 24. This is an important feature of the invention in that heretofore it was not believed possible to form projections such as 24 in a rotational molding process because it was not possible to adequately heat the mold parts which would form such projections. However, by the present invention the problems of the prior art have been overcome and satisfactory molds having hollow projections such as the guide projections 24 in the container 10 can be provided.

At the completion of the molding process, i.e., when container 10 is completely formed, the mold is removed from frame 70, between heads 72, 74 and is set to cool. Once cooled, the formed container can be conveniently removed from the mold.

Accordingly, it is seen that a relatively simple and inexpensively constructed container 10 for use as a dispensing container for stacks of plates or the like can be formed in a one-piece construction by a simple and inexpensive rotational molding process. This is advantageously achieved by the provision of a specially constructed mold of the present invention which permits the single or one-piece construction of the container 10.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A mold for use in a rotational molding process comprising a hollow tubular mold member having first and second longitudinally spaced end portions, said first end portion of the mold member being closed and said second end portion being open and including a peripheral flange extending outwardly from said tubular member, said flange having a plurality of independent peripherally spaced hollow projections extending outwardly therefrom and away from said open end along lines extending generally parallel to the longitudinal axis of said tubular member; said hollow projections being open to the atmosphere through said flange on the side thereof opposite the projections whereby the interior of said projections open towards the closed end of said tubular member on the outside thereof.

2. The mold as defined in claim 1 wherein said flange includes a peripheral collar located radially outwardly of said projections, said collar extending generally perpendicularly to the flange and away from said open end of said tubular member.

3. The mold as defined in claim 2 including a cover for said mold, said cover having a peripheral edge portion for receiving said collar thereby to cover the open end of said mold.

4. The device as defined in claim 2 wherein said tubular member has a generally elongated cylindrical configuration.

5. The device as defined in claim 4 wherein said projections are tapered from a base on said flange to a narrow free end portion thereof.

6. The mold as defined in claim 3 including means on said cover and on the outer surface of said closed end for mounting said mold in an apparatus for rotationally molding an object in the mold.

7. The mold as defined in claim 3 wherein said tubular member and said cover are formed of metal.

8. The mold as defined in claim 7 wherein said cover has an opening therein to permit visual inspection of the interior of the mold.

* * * * *